(12) United States Patent
Ellson et al.

(10) Patent No.: US 6,357,847 B1
(45) Date of Patent: Mar. 19, 2002

(54) METHOD AND APPARATUS FOR STITCHING PRINT SWATHS IN AN IMAGE-RENDERING DEVICE

(75) Inventors: Richard N. Ellson, Palo Alto, CA (US); David A. Mantell, Rochester, NY (US); Stephen David White, Santa Clara, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/739,854

(22) Filed: Dec. 18, 2000

(51) Int. Cl.[7] ................................. B41J 29/38
(52) U.S. Cl. ........................................ 347/12
(58) Field of Search .................. 347/40, 12, 41; 358/298

(56) References Cited

U.S. PATENT DOCUMENTS 5,053,793 A  10/1991  White et al. ............... 347/145
5,912,683 A  *  6/1999  Eade ............................ 347/40

* cited by examiner

Primary Examiner—Thinh Nguyen
(74) Attorney, Agent, or Firm—Fay, Sharpe, Fagan, Minnich & McKee, LLP (57) ABSTRACT

This invention relates to a method and apparatus for stitching print swaths in an image-rendering device such as an acoustic ink printer. More particularly, the invention is directed to a method implemented in an apparatus to reduce the visual artifact caused by inaccurate paper advance between neighboring swaths of an ink emitter printhead. The method includes the provision of a "puzzle cut" or "zipper" edge between swaths. In this regard, the image is divided into swaths and the edges thereof are dithered to vary the depth of the cut in accordance with the expected paper advance accuracy and other printing characteristics such as noise and variations in the width of print swaths for different printheads.

22 Claims, 8 Drawing Sheets

METHOD AND APPARATUS FOR STITCHING PRINT SWATHS IN AN IMAGE-RENDERING DEVICE

BACKGROUND OF THE INVENTION

This invention relates to a method and apparatus for stitching print swaths in an image-rendering device such as an acoustic ink printer. More particularly, the invention is directed to a method implemented in an apparatus to reduce the visual artifact caused by inaccurate paper advance between neighboring swaths of an ink emitter printhead and drop misdirection. The method includes the provision of a "puzzle cut" or "zipper" edge between swaths. In this regard, the image is divided into swaths and the edges thereof are dithered to vary the depth of the cut in accordance with the expected paper advance accuracy and other printing characteristics such as noise and variations in the width of print swaths for different printheads.

While the invention is particularly directed to the art of reducing artifacts in acoustic ink printing applications, and will be thus described with specific reference thereto, it will be appreciated that the invention may have usefulness in other fields and applications. For example, the invention may be used in ink jet printing or other types of printing where an array of ink emitters or ejectors is used to print swaths across a page on a pixel basis.

Figure 1:
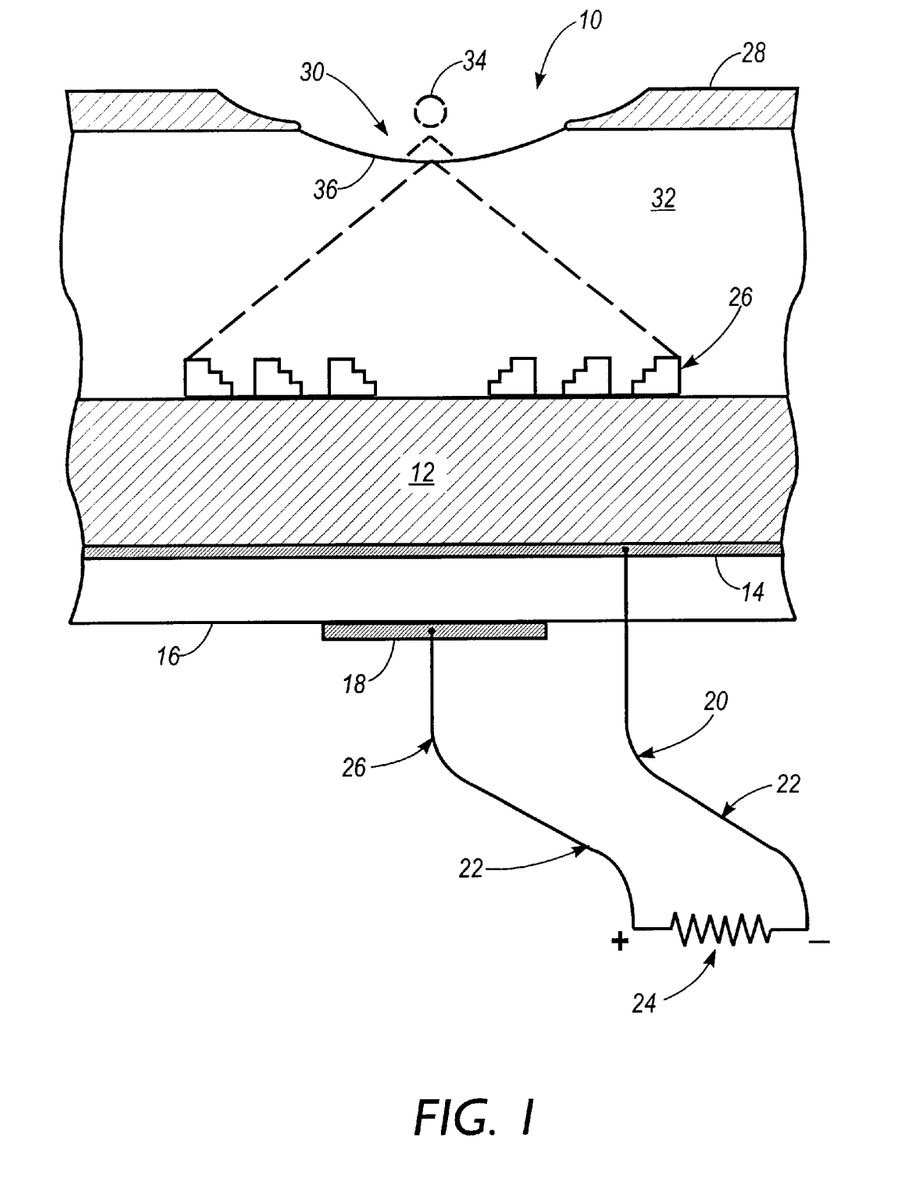
FIG. 1 illustrates an acoustic ink printing emitter.

By way of background, it is advantageous to understand the basic operation of acoustic ink printing emitters to fully appreciate the problems addressed by and advantages of the present invention. In this regard, FIG. 1 provides a view of an exemplary acoustic ink printing ejector 10. While a single ejector is illustrated, an acoustic ink printhead typically consists of a number of the ejectors arranged in an array configuration. A typical acoustic ink printhead includes, for example, 1024 emitters that emit drops on a print medium. Drops of ink are emitted to form pixels of the image. A pixel can comprise no drops, one drop or multiple drops. In addition, multiple printheads are generally used in a printer. Moreover, it is to be appreciated that material other than ink may be emitted by the printhead.

As shown, ejector 10 includes a glass layer 12 having an electrode 14 disposed thereon. A piezoelectric layer 16, preferably formed of zinc oxide, is positioned on the electrode layer 14 and an electrode 18 is disposed on the piezoelectric layer 16. Electrode layer 14 and electrode 18 are connected through a surface wiring pattern representatively shown by lines 20 and 22 to a radio frequency (RF) power source 24 which generates power that is transferred to the electrodes 14 and 18. On a side opposite the electrode layer 14, a lens 26, such as a concentric Fresnel lens, or other appropriate lens, is formed. Spaced from the lens 26 is a liquid level control plate (also called an orifice plate) 28, having an opening or orifice 30 formed therein. Fluid, or ink, 32 is retained between the orifice plate 28 and the glass layer 12. The orifice 30 is aligned with the lens 26 to facilitate emission of a droplet 34 from ink surface, or meniscus, 36. Ink surface 36 is, of course, exposed by the orifice 30.

The lens 26, the electrode layer 14, the piezoelectric layer 16 and the electrode 28 are formed on the glass layer 12 through photolithographic techniques. The orifice plate 28 is subsequently positioned to be spaced from the glass layer 12. The ink 32 is fed into the space between the orifice plate 28 and the glass layer 12 from an ink supply.

As noted above, an acoustic ink printing application, acoustic ink emitters of FIG. 1 are arranged in an array on each printhead. It should be recognized that, in most cases, the printheads used are not full page width array printheads so printing must be accomplished in print swaths across each page. As a result, visual artifacts may appear between the swathes. That is, if a swath overlaps with another swath, dark artifacts appear in the image. On the other hand, if the swaths are not placed close enough together to allow the printed ink to spread and create a substantially uniform layer at the swath boundary, the color of the underlying print medium may show through. For a white printing medium, this would appear as a white line between the swaths.

U.S. Pat. No. 5, 053,793 to White et al., and commonly assigned, relates to electrostatic recorders in which writing is accomplished by contemporaneously pulsing the voltage of sets of recording stylus electrodes, arranged in an array, of selected complementary electrodes. More particularly, the invention relates to laterally shifting, or dithering, the boundaries of the sets of stylus electrodes and subsequent scan lines so as to prevent the set boundaries from being aligned, in order to eliminate visible striations extending in the process direction.

However, it would nonetheless be desirable to have a system and/or method to address the problems noted above in the acoustic ink printing environment, or similar such environments utilizing bit maps, emitters, and swath-type printing.

As such, the present invention contemplates a new and improved method and apparatus for stitching print swaths in an image-rendering device that resolve the above-referenced difficulties and others.

SUMMARY OF THE INVENTION

A method and apparatus for stitching print swaths in an image-rendering device are provided.

In one aspect of the invention, a method comprises steps of obtaining an image comprising pixels arranged in columns and rows and creating stitch regions in the image, the stitch regions 1) being defined by a predetermined number of columns or pixels, 2) corresponding to overlap regions of the print swaths and 3) including a transition from the first print swath to the second print swath in the overlap region, the transition occurring at different pixel locations for selected rows of pixels of the image.

In another aspect of the invention, a method comprises the steps of obtaining an image, generating a bitmap based in the image, selecting swath portions of the image based on the bitmap, dithering edges of the swath portions, storing print data on the swath portions having the dithered edges, and printing the image based on the print data.

In another aspect of the invention, an apparatus comprises a bitmap generator operative to generate a bitmap based on an input image, an image processor including a swath portion determining module operative to determine swath portions of the image based on the bitmap and a dithering module operative to dither edges of the swath portions, and a print control module operative to control printheads based on the swath portions having dithered edges.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 2:
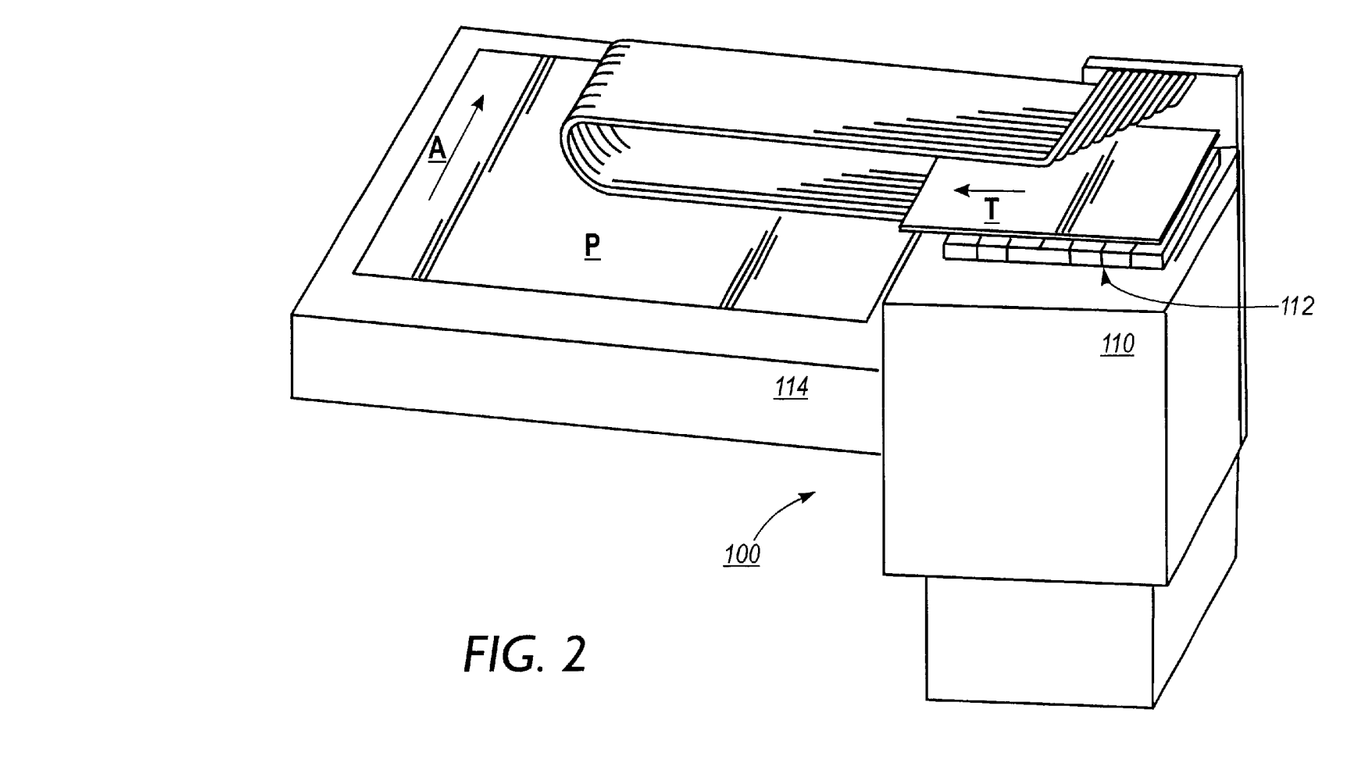
FIG. 2 is a representative view of an acoustic ink printer.

Referring now to the drawings wherein the showings are for purposes of illustrating the preferred embodiments of the invention only and not for purposes of limiting same, FIG. 2 provides a partial view of a system 100 into which the present invention is incorporated. Although shown in a particular exemplary configuration, it is to be appreciated that an acoustic ink printer may take a variety of forms. In this regard, for example, the relative positions of components may be changed to accommodate a particular desired configuration. Nonetheless, the features of the invention may still be suitably applied.

Figure 7:
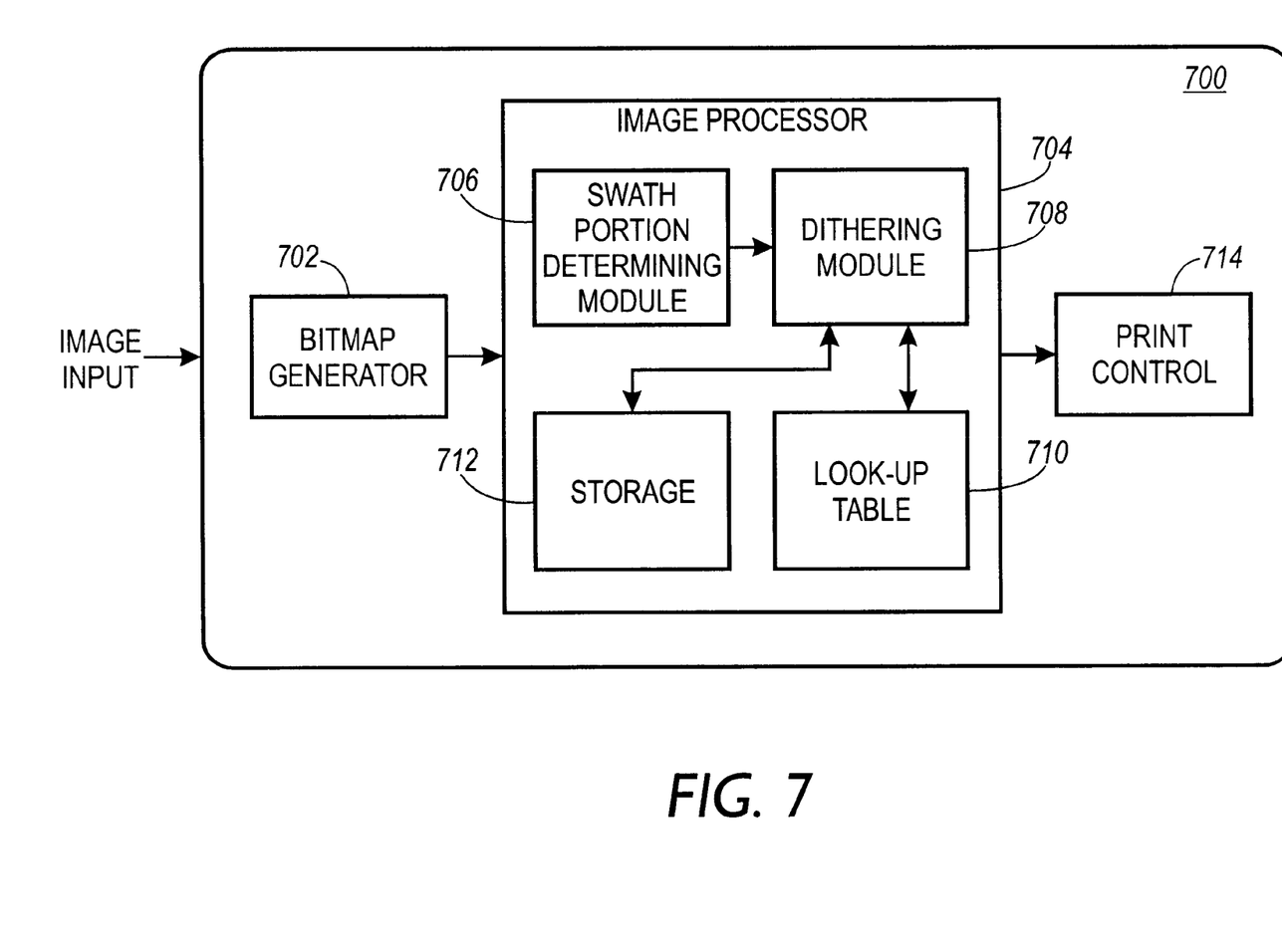
FIG. 7 is a block diagram of a system according to the present invention.

In FIG. 2, an ink delivery and control apparatus 110 is shown in a relative relationship to a piece of paper P upon which the printheads 112 of the acoustic ink printer 100 (not shown in its entirety) will emit droplets of ink. The ink delivery and control apparatus contains suitable mechanisms and materials (e.g. ink supplies) to physically supply ink to the printheads as well as hardware and/or software control structures useful in the printing process. The basic control structures and processing modules for the system are illustrated in FIG. 7. Also shown is a print medium support structure 114. It is to be appreciated that such a structure also contains suitable mechanisms (not shown) to allow for proper paper advancement during printing.

In the position illustrated, the printheads 112 are "docked". In operation, however, the printheads translate in the direction T across the page P to print a swath of ink. Once the swath of ink is printed, the paper P advances in the direction shown by the arrow A by a predetermined amount so that another swath can be printed.

Of course, it should be reiterated that this is merely an exemplary embodiment of an acoustic ink printer to which the present invention may be applied. Configurations are contemplated in which is no translation of the acoustic ink printheads is necessary. Rather, the acoustic ink printheads are placed across the entire page. Moreover, there may be embodiments where the printheads, whether translated or not, are advanced in the paper advance direction as opposed to the paper being advanced. In any of these embodiments, or others, the present invention may nonetheless be applied with appropriate modifications that will be apparent to those skilled in the art upon a reading of this disclosure.

As noted above, the printing of the swaths oftentimes result in the generation of visual artifacts within the image due to the inaccuracy of printing in this manner. For example, the printheads may not be aligned properly. In addition, the paper advance (or printhead advance) may not be accomplished in an accurate manner.

Figure 3:
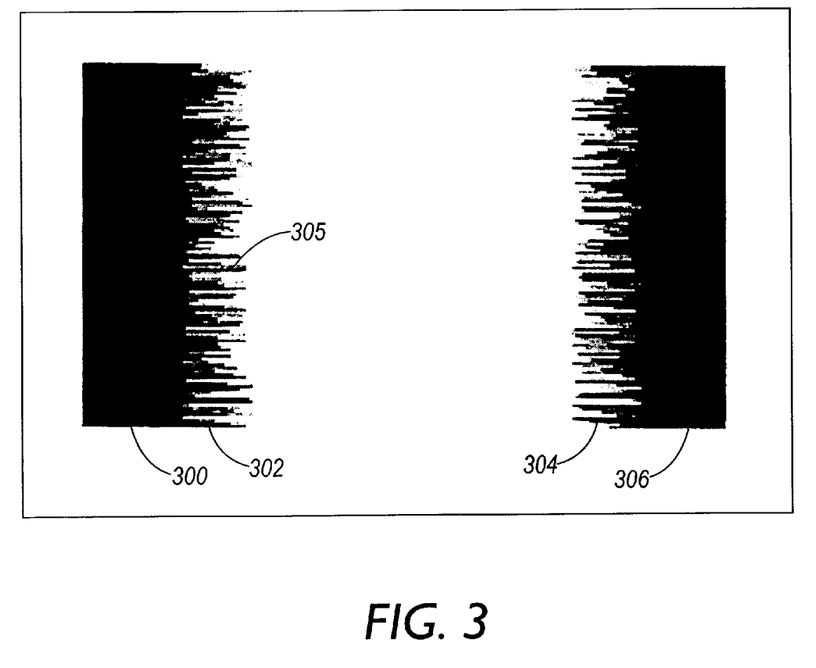
FIG. 3 shows the edges of print swathes having a puzzle cut according to the present invention.

Accordingly, with reference now to FIG. 3, the present invention provides a dithered edge to each print swath in such a manner so as to create a "puzzle cut" or "zipper" between print swaths. The dithering process scatters the edge from a single line into a multitude of widely separated pixels dispersed throughout the overlap region, and thereby makes the artifact more difficult for the human visual system to detect. As shown in FIG. 3, a first swath 300 has a dithered edge 302 that corresponds to a dithered edge 304 of a second swath 306. It is to be appreciated that in practice, the swathes 300 and 306 meet on the printing medium and comprise an overlap region between the swaths. Such swaths are shown as separated in FIG. 3 merely to illustrate the puzzle cut arrangement. Protrusions, or tines, such as the one represented by 305, are of varying length and form the puzzle cut or stitch or zipper between swaths.

It should also be apparent that the puzzle cut is preferably accomplished on a color-by-color basis. That is, the puzzle cut for pixels of a particular color of the image does not necessarily replicate the cut for the other colors of the image. This provides for improved visual effect.

Therefore, the method according to the present invention generally comprises obtaining an image that has pixels arranged in columns and rows and creating stitch or overlap regions in the image. The stitch regions are defined by a predetermined number of columns or pixels, correspond to overlap regions of the print swaths, and include a transition from the first print swath to the second print swath in the overlap region. A transition at each row occurs at different pixel locations for consecutive pairs of rows to create the puzzle cut effect. As such, preferably, a pair of rows includes a transition at the same pixel location for each row of the pair but adjacent pairs of rows include the transition in different respective pixel locations.

Alternatively, a transition at each row could occur at different pixel locations for any selected rows (e.g. selected consecutive rows), as opposed to each pair of rows. Therefore, each row could include a transition at a different pixel location relative to adjacent rows. Indeed, any number of rows could be grouped together for this purpose, although variations in the visual result will consequently occur. In this regard, for an integer N, the transition occurs at same pixel locations for N consecutive rows repeatedly along the stitch of the image. Use of row pairs is preferred as providing desired print quality.

In this regard, it was found that the grouping of rows to improve visual quality is a function of how unacceptable the motion repeatability is in the scanning direction. The advantage of the present invention is that it provides compensation for poor paper advance by pushing the line artifact into a higher spatial frequency. That is, use of the present invention scatters the line of mismatch into isolated point artifacts for each color all over the overlap zone. Preferably, one would like to scatter this as much as possible. As such, changing the puzzle or "tine" length with each row would be optimal. This is not always the case as there are competing visual artifacts. In particular, if the repeatability of the motion system in the scanning direction would not hold to within a pixel, then the puzzles would no longer mesh as they would desynchronize down the page. This visual artifact can be significant—perhaps as unacceptable as the poor overlap artifact sought to be hidden. To prevent this, it was found that the frequency of puzzle tine length changes can be reduced, making the puzzle illustrated in FIG. 3 more stubby fingered. In particular, having two consecutive rows with the same puzzle indent reduces the scan direction artifact with only minimal impact on the paper advance artifact. For very poor scan direction repeatability, the number of consecutive rows with the same tine length could be increased further to three or more.

Figure 4:
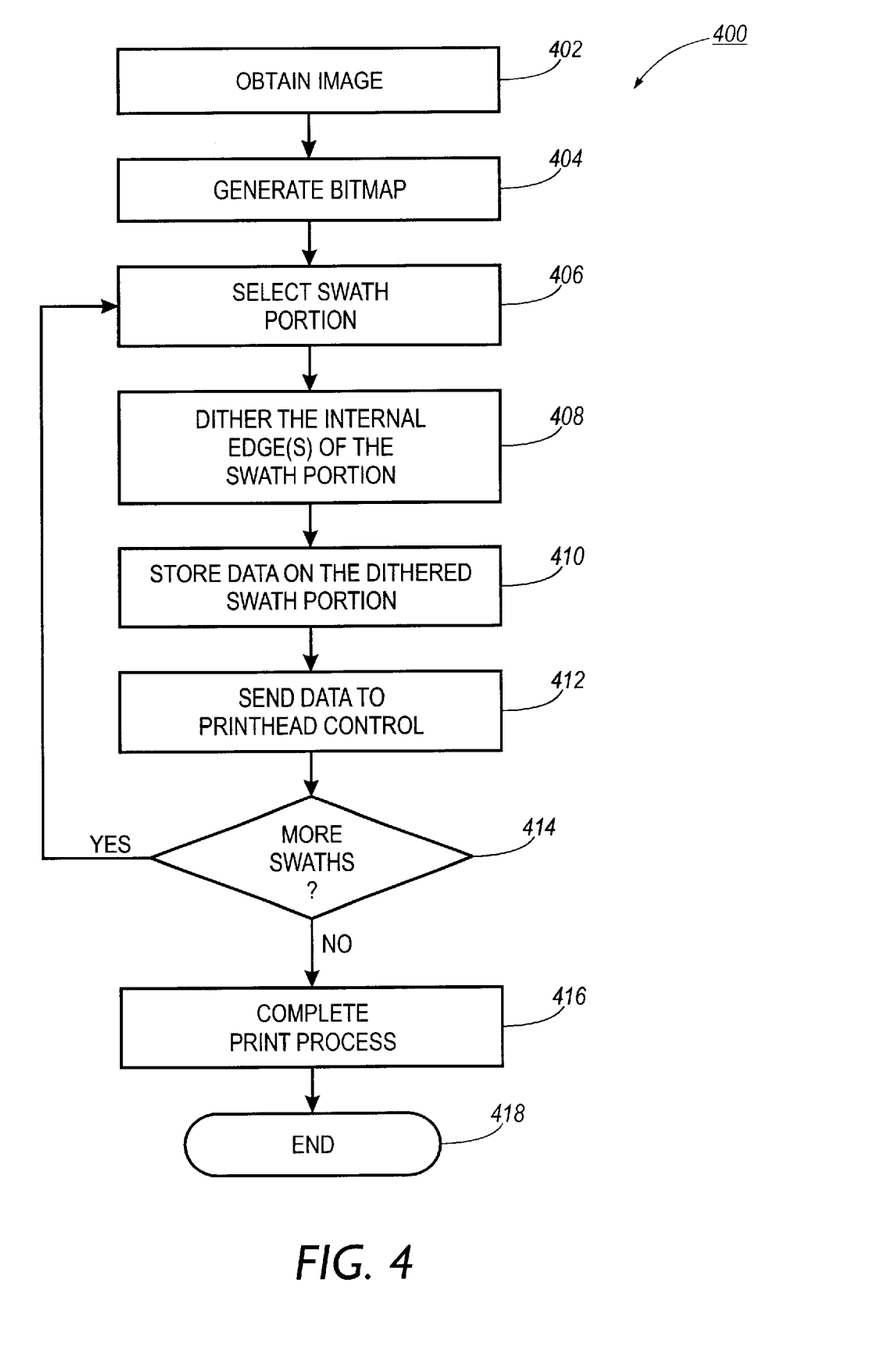
FIG. 4 is a flowchart illustrating a method according to the present invention.

Referring now to FIG. 4, a more particular method according to the present invention is shown. As illustrated, an image is obtained (step 402). Next, a bit map for the image is generated (step 404). It is to be appreciated that the generation of the bit map includes generating information to implement a four-color bit map, which is well known in the art, wherein each pixel of the bit map stores information relating to the number of drops of each color that is to be emitted by the printhead to fully render the image pixel. While a four-color bitmap is preferred, any multi-color bitmap will suffice if color printing is desired. Further, during the bit map generation process, the image is suitably scaled for printing and appropriate rendering algorithms such as error diffusion algorithms are run. Alternatively, separate color image planes may be considered during the bit map generation process whereby each color plane effectively has its own bit map. However, it is preferred that a single four-color bit map be generated.

Subsequently, a swath portion of the image is selected (step 406). The swath portion may be of varying size but should generally reflect the desired portions of the printhead that will be used to print the swath. Preferably, data reflecting the swath width is stored in (or programmed into) the system and accessed using suitable data retrieval techniques. Next, the internal edges (i.e. edges that are not on the edge of the image) of the swath are dithered according to the present invention (step 408). The width of the overlap zone and the number of consecutive rows having the same or nearly the same puzzle indent having been predetermined based on the paper advance and process motion characteristics.

The dithering is preferably accomplished for each separate color of the image. The data utilized comprises a starting point for each row to be printed by the printhead as well as data indicating the length of the run to be printed for that row. That is, the data used for dithering indicates where printing should start for that row in the swath and how far the printing should continue. Along these lines, preferably, the starting point data is represented by random or pseudo-random numbers that are of a suitably random nature such that they preferably result in a pattern comprising only high frequency components and not repeating over a distance of at least a few millimeters. These numbers are generated from 0 to 7 and stored within the system while the length of run data is preferably a fixed number. In the preferred embodiment, a sequence of 256 random starting points is stored in a look-up table or the like. In this preferred embodiment, so long as the same random numbers are used for starting points in each row, then the consecutive swaths will properly meet in the rows so that the image properly transitions from the first swath to the second swath within the appropriate regions of the image.

The data for the dithered swath portion is then stored (step 410). Subsequently, at an appropriate time, the swath data is passed on to the printhead control modules (step 412). At that point, a determination is made as to whether any further swaths are to be included in the printed image (step 414). If so, steps 406 to 414 are repeated. If not, the printing process is simply completed (step 416) and the method ends (step 418).

Figure 5:
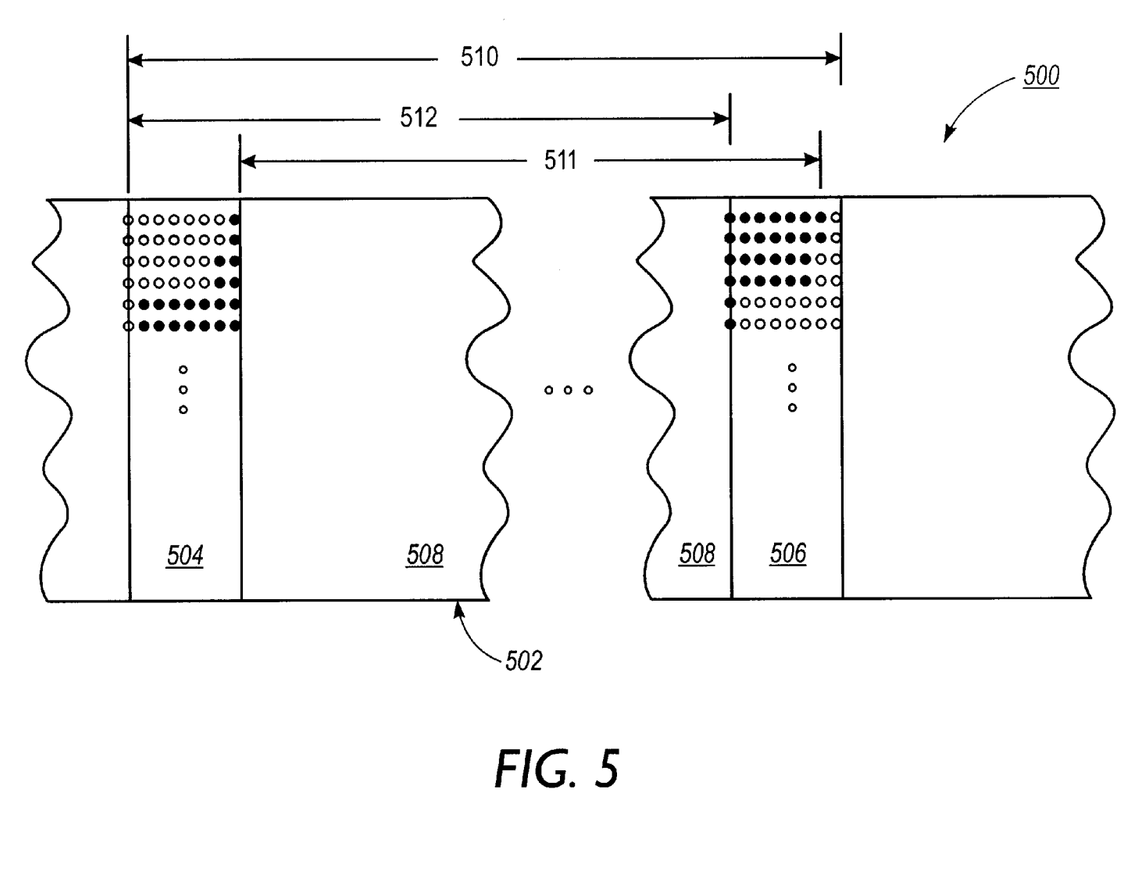
FIG. 5 shows an illustration of a portion of an image according to the present invention.

Referring now to FIG. 5, a portion of an image 500 is shown. For ease of explanation, the example of FIG. 5 reflects only a single color, single pass printing. However, it is to be appreciated that the invention may be applied, and is indeed preferably applied, to multicolor printing. In these situations, each color plane is preferably treated distinctly in the application of the present invention, as is illustrated in FIG. 3 (although not in color). The preferred embodiment for multicolor printing would include having a different phase to the pattern of the overlap region for each color. The invention may also be applied to multipass printing, as will be described below.

As illustrated, a swath 502 has a swath width 510, which includes a first overlap or stitch region 504 and a second overlap or stitch region 506, as well as a base region 508. Preferably, each overlap region is 8 pixels wide. The base region 508 may be any width but is preferably greater than 16 pixels to maintain sufficient separation between the overlap regions so that the overlap regions are visually difficult to detect in the final rendered image.

As shown, in the overlap regions 504 and 506, the darkened circles represent pixels that will be printed, or active pixels, in the swath 502 whereas non-darkened circles indicate pixels that will not be printed in the swath 502. In this regard, row 1 of swath 502 shows 1 pixel darkened in overlap region 504 and 7 pixels darkened in overlap region 506. It is to be appreciated that the undarkened pixels in overlap region 504 are printed during the printing of the swath printed previous to the printing of the swath 502 whereas the undarkened pixels in overlap region 506 are printed during the printing of the swath portion printed subsequent to the swath 502. It is preferred that the dithering of the edge occurs for every 2 rows of pixels. This has been determined to be visually aesthetic as discussed above; however, any number of rows could be treated in this manner and still fall within the scope of the invention. While the invention is described for stitching opposite ends of a printhead, it should also be appreciated that is possible to stitch the output from different printheads in exactly the same manner. This situation might arise in a full width printer in which the printheads are aligned with an overlap region. The printheads may be stationary and the paper may move or the printheads may be scanned, the additional printheads used simply to increase print speeds.

Likewise, rows 3 and 4 of the overlap region 504 show 2 active pixels while the overlap region 506 shows 6 active pixels in rows 3 and 4. Again, the undarkened pixels in each of those overlap regions will be printed during the printing of the adjacent swath in the swath portions. Last, the overlap region 504 includes 7 active pixels in each of rows 5 and 6 whereas the overlap region 506 shows only 1 active pixel in these rows.

It should be understood by those skilled in the art that the numbers generated to produce the pattern shown on overlap regions 504 and 506 are repeated for previous and subsequent swath printing processes so that the image is properly "zipped" between the swath portions. That is, the same random number is used for the starting point for all print runs in a row. Preferably, as noted above, the data stored representing the random numbers generated for the start positions for each row is a number between 0 and 7. So, for example, the start position for row 1 would be 7, the start position for row 3 would be 6 and the start position for row 5 would be 1. Because the print runs for each row are constant, there is no need to store data indicating where the print run ends. As can be seen by an exemplary print run 511 shown, the run preferably begins in the first overlap region, spans the base region, and terminates in the next overlap region. It should be appreciated that a "print run" is the width of printable ejectors at any particular drop cycle.

It should be further appreciated that, as an alternative, the random or pseudo-random numbers could be generated "on the fly". Such an embodiment would, however, entail other suitable modifications to the system to accommodate such circumstances where the repetition and predictability of stored values would be absent. Along similar lines, the run lengths could be varied and corresponding starting and ending points could be designated or determined. Again, suitable modifications would then be required to accommodate these features. In this regard, any such modifications would need to take into account the necessity to have the print swaths meet in an overlap region with acceptable print quality.

Figure 6:
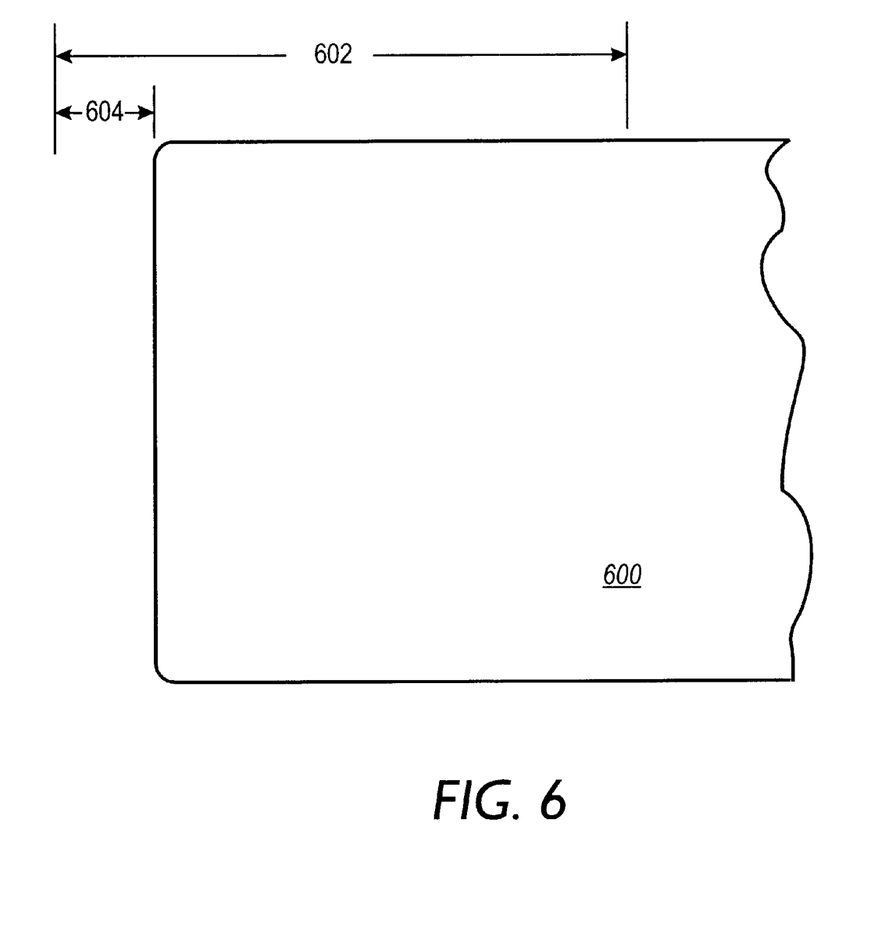
FIG. 6 shows an illustration of a portion of an image according to the present invention.

Referring now to FIG. 6, a portion of the printed image 600 is shown to illustrate application of the invention at the leading edge of the image. As illustrated, the steps of the present invention are accomplished at an edge using the swath width 602 as shown. Significantly, the swath width extends past the leading edge of the image by an amount corresponding to the width 604 of the overlap region (e.g. 8 pixels) so that no puzzle cut effect is perceived in the image in that region. In the processing of the data that is sent to the print control structures of the printheads, any active pixels that fall within the overlap region that extend beyond the image are simply set to zero, which effectively inactivates the location to prevent ink from being emitted toward an unintended location.

As an alternative, and preferred where data storage capability is not restricted, data could simply be supplied to the overlap region that extends past the edge in such a manner so as to print a larger image. In this case, it is preferred that the edge of the enlarged portion be straight, and not jagged. As such, suitable modifications would be required, such modifications likely resulting in storage of greater amounts of data.

Of course, similar measures can be taken at the back edge of the last swath of the image so that the opposite edge of the image is likewise of a desired conformation and not jagged as would occur if the edge were inappropriately dithered. To accomplish this, any pixels of the last swath printed that extend beyond the edge of the image are preferably inactivated. Suitable accommodations are preferably implemented depending on whether the back edge of the image falls within the overlap regions or the base region of the last swath.

Referring now to FIG. 7, a print control system 700 into which the present invention is incorporated is shown. The system may be appropriately located within an acoustic ink printer, such as within the module 110 of the printer illustrated in FIG. 2. As shown in FIG. 7, the system 700 includes a bit map generator 702 that receives an input image from an appropriate source. The bitmap is generated within the bitmap generator 702 as indicated above and as those of skill in the art will understand.

The bitmap generator 702 is connected to an image processor 704. The image processor 704 includes a swath portion determining module 706, a dithering module 708, a look-up table 710, and a swath portion information storage module 712. It is to be appreciated that these elements are utilized in the methods described above as those skilled in the art will appreciate. For example, the swath portion determining module 706 determines and maintains information on the swathes of the image that are manipulated by the present invention. For example, data reflecting swath width is preferably stored in this module.

The dithering module 708 preferably runs suitable processes on the edges of the swath portions of the image to create the puzzle cut effect. In this regard, the dithering module preferably accesses the random or pseudo-random numbers (i.e. starting points for each row) from the look up table 710. The dithering module also stores (or has access to) data reflecting the run lengths for printing any given row. In the preferred embodiment, this data is constant for all rows of a given printing process and is a function of the respective widths of the overlap regions and the base region, as illustrated in FIG. 5. Of course, in cases where variations of the preferred embodiment are implemented, the dithering module may include additional functions. For example, it may generate the stored random numbers (e.g. starting points), or generate the random numbers on the fly. Further, the dithering module may function to calculate starting and/or ending points and run lengths, if desired, and it may do so using a different method for each color to be printed in a multicolor image. Random numbers are not necessarily required though, since someone might be able to describe a sequence of numbers not randomly generated that result in a similar but still acceptable puzzle cut.

As to the look-up table 710, it is preferably of conventional form and stores the 256 random numbers used as starting points for print runs in the preferred embodiment. The numbers in the table would be used sequentially, and in a cyclic manner. That is, when the final entry was used, the pointer would be reset to the first entry. Preferably, each stored random number corresponds to a pair of rows. In this way, the stored numbers accommodate 512 rows of print before the numbers are repeated. However, it should be recognized that the form and use of the look-up table would vary depending on the precise nature of the system into which it is incorporated.

For a multicolor application, the table 710 can be accessed at different points to provide a dithering, which is out-of-phase for each of the colors. For example, given a table of 256 entries for a four-color image, the first color could have a starting point at entry number 1, the second color at 65, the third at 129 and the fourth at 194. Since each color would cycle through the table at the same rate, the colors would continue to access the table at different positions throughout the page.

It is to be recognized that the configuration of the image processor shown is exemplary only and may take a variety of forms.

The image processor 704 is also connected to suitable modules 714 that implement the printhead control that is used to selectively active and/or fire emitters in the printhead. The printhead control techniques preferably are those typically used in the acoustic ink printing and/or inkjet fields. The print control preferably involves determinations as to whether certain portions of the printhead will be activated for any particular pass of printing.

It should be appreciated that the invention may be adapted to accommodate a variety of printing processes that involve any number of printing passes to print a portion of the image. For example, in its simplest form, the invention may be applied to systems that operate in a one-pass mode whereby a portion of the image, or swath, is printed in one pass of the printhead over a region. The printhead is then advanced to print on an entirely different region of the print medium, excluding any overlap that may be necessary to implement the present invention. So, with reference back to FIG. 5, the swath width 510 corresponds to the total length of the active portion of the printhead and the advance 512 corresponds to that length less the width of one overlap region (e.g. 8 pixels). It should be appreciated that the active portion of the printhead may be a subset of an entire width of a printhead array in, for example, circumstances where selected emitters are unusable.

Preferably, however, the invention is applied to a system that uses multiple passes of the printhead in order to print a swath of the image. In this regard, a four pass system is preferred in many circumstances, but a two pass system would also be suitable and will be described for simplicity. In a two pass system, with reference to FIG. 8, the swath width 810 corresponds to the length of the print head and the advance 812 corresponds to one-half of that length less the width of one overlap region. In such a system, when printing begins, the first pass has first drops emitted by the first half of the printhead. Then, the printhead advances and the first half of the printhead begins printing the second half of the swath while the second half of the printhead continues to print the first half of the swath. These iterations are continued and, in the end, each part of the swath of printing receives two passes of the printhead. It should be appreciated that in order to accomplish printing in this manner, the swath information is preferably maintained so that the printheads properly print in a particular swath during the appropriate pass. In this regard, it would be advantageous to also maintain information in the system as to the drops that should be emitted in each pass.

Figure 8:
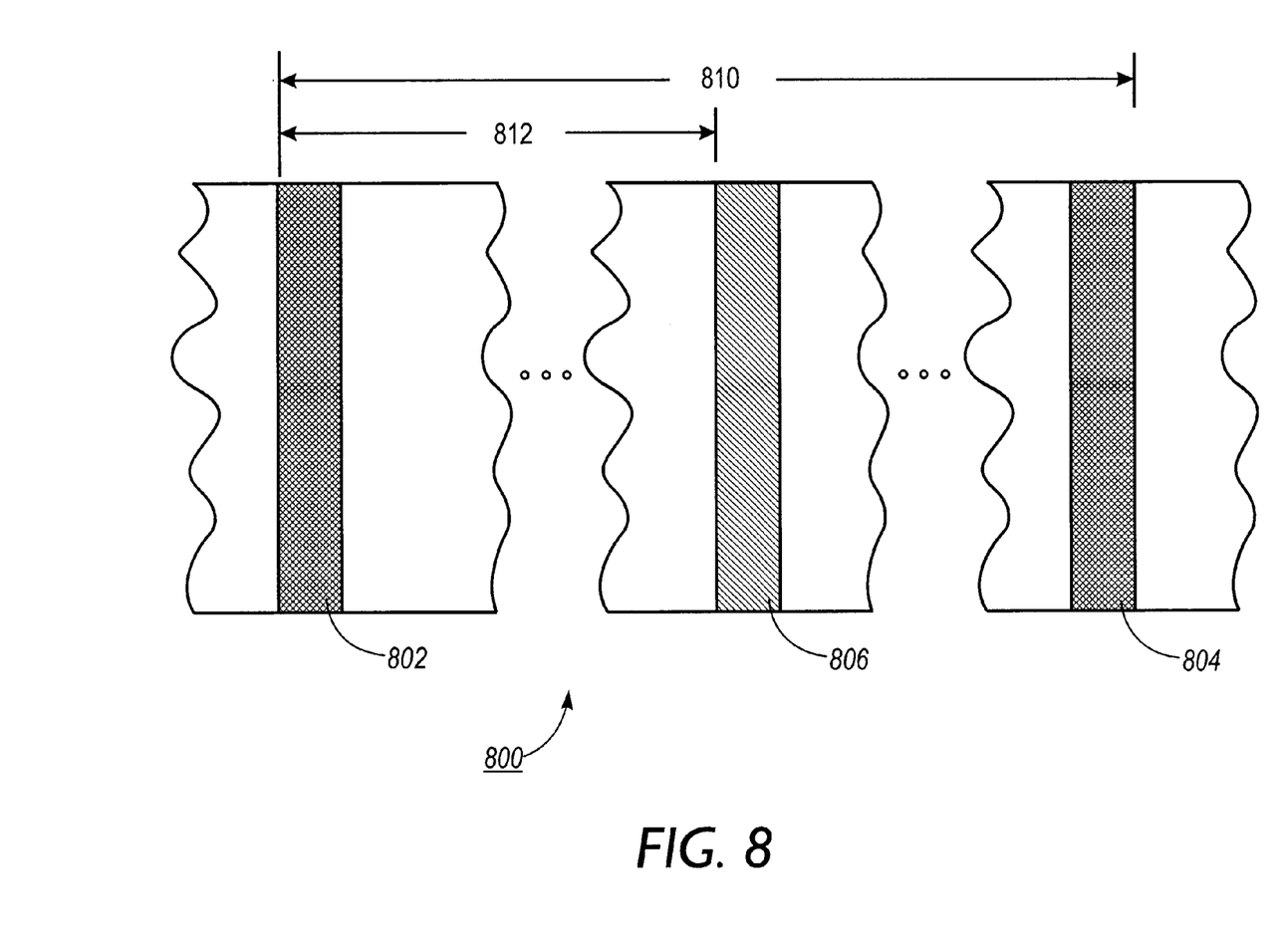
FIG. 8 is an illustration of a portion of an image according to the present invention.

It can further be seen in FIG. 8 that overlap or stitch regions 802 and 804 of image 800 are stitched during a current swath while overlap or stitch region 806 is stitched during a previous and a next swath. These principles can be implemented and adapted to a four-pass printing system, as those of skill in the art will appreciate.

The embodiments described herein thus far relate to dithering of the edges of the swath portions on a pixel basis. However, it is to be appreciated that acoustic ink printing is of such a nature so as to allow the printing of multiple dots per pixel. As such, the dithering according to the present invention may be implemented on a dot basis instead of on a pixel basis. A different dither could be defined for the second drop within a pixel from the one that is defined for the first drop, thereby further randomizing the dithered region. The other features of the invention would be applied substantially as described above. However, to obtain acceptable image quality, measures would also be implemented to reduce any resulting Moire artifacts.

It should be understood that the present invention may be implemented using suitable hardware and/or software techniques that should be apparent from the disclosure hereof. Of course, certain elements of the preferred embodiment are more readily implemented in one or the other of hardware or software; the invention is not so limited.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A method for processing images to be rendered by an image rendering device having a printhead including an array of ink emitters that are adapted to print in swaths of ink across a page, the method comprising steps of:

obtaining an image comprising pixels arranged in columns and rows; and, creating stitch regions in the image, the stitch regions 1) being defined by a predetermined number of columns, 2) corresponding to overlap regions of the print swaths and 3) including a transition from the first print swath to the second print swath in the overlap region, the transition occurring at different pixel locations for selected rows of pixels of the image.

2. The method as set forth in claim 1 wherein for an integer N, the transition occurs at the same pixel locations for N consecutive rows repeatedly along a stitch of the image.

3. The method as set forth in claim 1 wherein the transition occurs at different pixel locations for each consecutive pair of the rows of the image.

4. The method as set forth in claim 1 wherein the creating comprises generating a bitmap, selecting swath portions of the bitmap and dithering edges of the swath portions in the overlap regions.

5. The method as set forth in claim 4 wherein the generating includes generating a multi-color bitmap.

6. The method as set forth in claim 5 wherein the generating the multi-color bitmap includes generating a four-color bitmap.

7. The method as set forth in claim 1 wherein the transition occurs at different pixel locations for each color of a row.

8. The method as set forth in claim 4 further comprising controlling printing of the swaths of ink based on the creating.

9. An apparatus for processing images to be rendered having a printhead including an array of ink emitters that is adapted to print in swaths of ink across a page, the apparatus comprising:

means for obtaining an image comprising pixels arranged in columns and rows; and, means for creating stitch regions in the image, the stitch regions 1) being defined by a predetermined number of columns, 2) corresponding to overlap regions of the print swaths and 3) including a transition from the first print swath to the second print swath in the overlap region, the transition occurring at different pixel locations for selected rows of pixels of the image.

10. The system as set forth in claim 9 wherein the transition occurs at different pixel locations for each consecutive pair of the rows of the image.

11. The system as set forth in claim 9 wherein for an integer N, the transition occurs at same pixel locations for N consecutive rows repeatedly along a stitch of the image.

12. The apparatus as set forth in claim 9 wherein the creating means comprises means for generating a bitmap, means for selecting swath portions of the bitmap and means for dithering edges of the swath portions in the overlap regions.

13. The apparatus as set forth in claim 12 wherein the generating means includes means for generating a multi-color bitmap.

14. The method as set forth in claim 13 wherein the means for generating the multi-color bitmap includes means for generating a four-color bitmap.

15. The method as set forth in claim 9 wherein the transition occurs at different pixel locations for each color of a row.

16. The apparatus as set forth in claim 12 further comprising means for controlling printing of the swaths of ink.

17. A method comprising the steps of:

obtaining an image;

generating a bitmap based on the image;

selecting swath portions of the image based on the bitmap;

dithering edges of the swath portions;

storing print data on the swath portions having the dithered edges; and, printing the image based on the print data.

18. An apparatus useful for rendering images in swath portions, the apparatus comprising:

a bitmap generator operative to generate a bitmap based on an input image;

an image processor including a swath portion determining module operative to determine swath portions of the image based on the bitmap, and a dithering module operative to dither edges of the swath portions; and, a print control module operative to control printheads based on the swath portions having dithered edges.

19. The apparatus as set forth in claim 18 wherein the dithering module is operative to dither the edges of the swath portions on a pixel basis.

20. The apparatus as set forth in claim 18 wherein the dithering module is operative to dither the edges of the swath portions on a dot basis.

21. The apparatus as set forth in claim 18 further comprising a look-up table having stored therein a series of random numbers accessible by the dithering module to vary starting points of printed rows to accomplish dithering.

22. The apparatus as set forth in claim 21 wherein the random numbers are used in a repetitious manner such that the printed rows each have accessed therefor the same random number for each swath.

* * * * *